April 22, 1941.  C. O. SPARHAWK  2,239,656
TROLLEY WIRE SUPPORT
Filed April 24, 1940  2 Sheets-Sheet 1
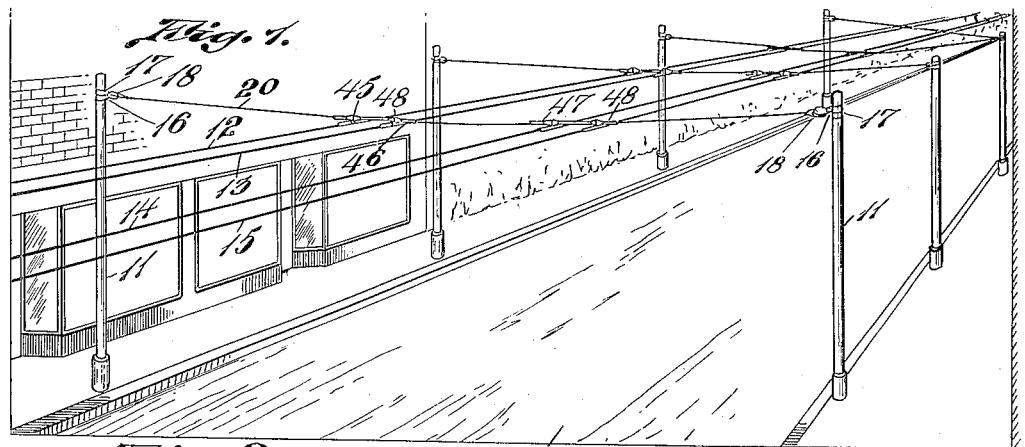
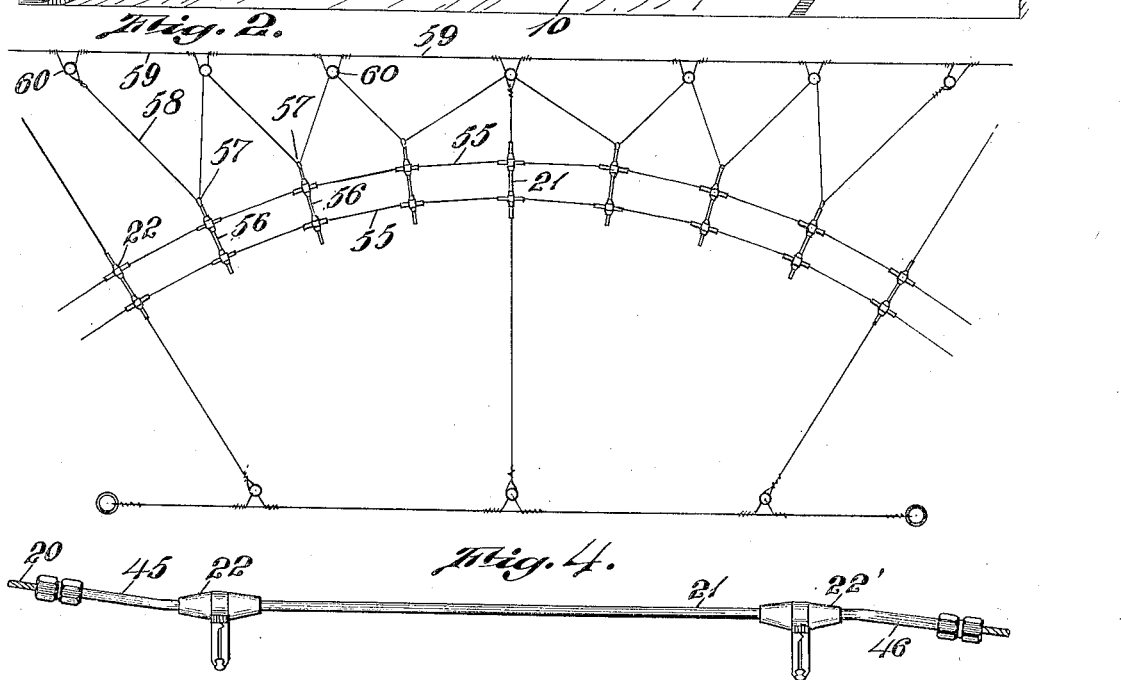
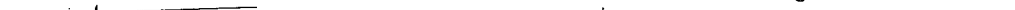
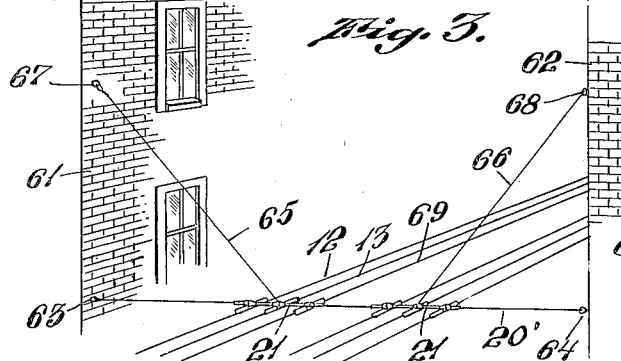
INVENTOR.
Corret O. Sparhawk
BY Barlow & Barlow
ATTORNEYS.

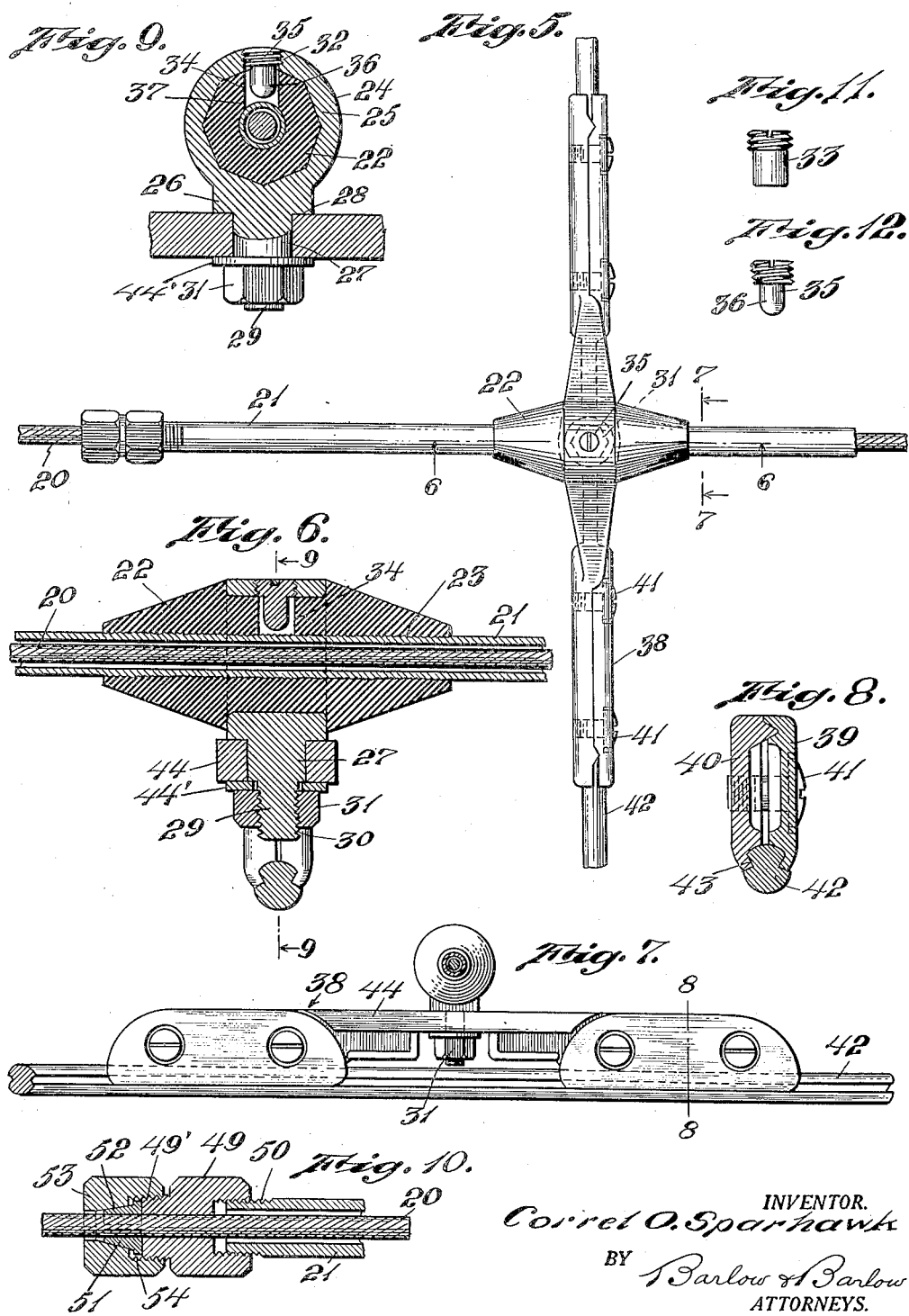

Patented Apr. 22, 1941

2,239,656

UNITED STATES PATENT OFFICE 2,239,656

TROLLEY WIRE SUPPORT

Correl O. Sparhawk, Warwick, R. I., assignor to United Electric Railways Company, a corporation of Rhode Island Application April 24, 1940, Serial No. 331,452

4 Claims. (Cl. 191—40)

This application is a continuation in part of my copending application Serial No. 308,653, filed December 11, 1939.

This invention relates to a trolley wire support and has for one of its objects to provide a support for a trolley wire or a pair or more of trolley wires which support will be of less weight, and therefore provide less strain upon the supporting poles, than comparable supports which are in use at the present time.

Another object of the invention is to reduce the surface area exposed upon which ice may accumulate.

Another object of the invention is to provide a trolley wire support which may be assembled in the desired relation which the parts are to bear one to the other, at a shop under favorable conditions prior to the placing of the device in working position, thus doing away with considerable labor in assembly at the location where the device is to be used.

Another object of the invention is to provide an arrangement whereby tension on the insulator, which is located between the trolley wire and its support, will be eliminated, thereby making possible the use of an insulator for its dielectric properties primarily enabling the same to be made of less weight.

Another object of the invention is to provide an arrangement by reason of its reduced weight whereby a larger number of supports may be used, for supporting the trolley wires for a change of its direction that the angles which make up the change of direction may be of a small degree of change.

Another object of the invention is to provide a protection for the insulation of the support so that the insulation will stand up even though a charge beyond that for which the insulation is designed is received and transmitted from the trolley wire to the ground.

Another object of the invention is to provide a lightning arrester in the hanger itself for the trolley wire.

Another object of the invention is to provide a sealed air gap that the insulator may become self-restoring even after transmitting a charge beyond that which is desired to protect.

Another object of the invention is to provide a simple means whereby the load inclination may be compensated so as to hold the support device substantially horizontal even though the load-supporting wire may extend at an angle having a pitch of 1-10.

Another object of the invention is to provide a tubular support which is of such material that it may be bent at the location of its installation for conforming to the desired inclination necessary.

With these and other objects in view, the invention consists of certain novel features of construction, as will be more fully described, and particularly pointed out in the appended claims.

In the accompanying drawings:

Fig. 1 is a perspective view of a street showing supporting poles and two pairs of trolley wires supported by these pairs of poles.

Fig. 2 is a top plan view illustrating the arrangement of supporting a pair of trolley wires about a curve.

Fig. 3 is a diagrammatic view illustrating the support of a trolley wire between two upstanding buildings on either side of the street.

Fig. 4 is a side elevation of one of the trolley wire support devices and a portion of the supporting cable extending therethrough.

Fig. 5 is a top plan view of a fragmental portion of the trolley wire support device shown in Fig. 3.

Fig. 6 is a sectional view taken centrally on line 6—6 thereof of Fig. 5.

Fig. 7 is a section on line 7—7 of Fig. 5.

Fig. 8 is a section on line 8—8 of Fig. 7

Fig. 9 is a section on line 9—9 of Fig. 6.

Fig. 10 is a section of a fragment of the device illustrating the means of clamping the supporting cable to the tubular member.

Fig. 11 is a side elevation of the plug used in molding.

Fig. 12 is a side elevation of the plug used in the finished device.

The supporting of trolley wires is usually by means of a heavy wire cable stretched between insulators with heavy caps clamped onto said wire cable by means of hooks, a flexing of this cable being required in order that these hooks may be engaged. An insulator is mounted in such cap and serves as a hanger from which the trolley wire is supported. This insulator in addition to its dielectric properties must be of sufficient strength so that the pull or weight of the trolley wire on one part of the insulator will be supported through the insulator. Such an arrangement requires the assembly of this cap and insulator upon the cable support at the location in which the cap is to be used. In cold weather, the efficiency of the worker is very much reduced by reason of the necessity of working under handicap conditions.

Further, the very latest insulators which are supplied on the market and in which an effort has been made to reduce the weight are yet sufficiently heavy so that a material strain is brought to bear upon the supporting poles. In icy weather, the ice which accumulates upon a structure of this character is considerable and adds considerably to the weight which must be supported by the poles. In order to improve this condition, I have made a support for a trolley wire in which the forces acting upon the insulator are in compression instead of in tension, thus making possible a lighter insulator from a strength standpoint and by reason of this factor, a material saving in weight is provided. Further, I have so arranged the support that it may be largely manufactured in the shop and then mounted in position over the road which is to be traveled by a very simple operation. I further provide for the spacing of two trolley wires such as are used in the trackless trolleys and I enable a pair of such trolley wire supports to be suspended from a single cable by passing the same through this support device.

I further provide for the adjustment necessary of trolley wires with reference to the support device and a clamping of the device in position on the support cable wherever desired. I also provide an arrangement for protecting the insulation so that should surges of current due to lightning storms be present upon the trolley wire, these may jump an air gap or lightning arrester arrangement prior to burning and destroying the insulation and thereby the insulation becomes self-restoring. I also propose a sealed condition for the air gap to prevent oxidation at the points across which an arc jumps and thus no deterioration occurs because of frequent arcing at the points of the gap; and the following is a more detailed description of the present embodiment of this invention, illustrating the preferred means by which these advantageous results may be accomplished:

With reference to the drawings, 10 designates the roadway upon which trackless trolleys are to be operated. The supporting poles 11 are located at either side of the road and two pairs of trolley wires 12 and 13 and 14 and 15 are arranged superimposed over the roadway 10. These trolley wires are supported from the poles 11 by some suitable loop 16 clamped to the pole as at 17 and supporting a ball-type insulator 18. A supporting cable or span wire 20 extends from one insulator 18 to the other insulator 18, which cable will sag slightly in the middle by reason of the weight which it supports. A practice which I am familiar with is that the sag will be one inch for every ten inches of horizontal extent. Thus the factor of strain applied to the supporting poles by reason of the weight will be very evident. In Fig. 3 I have illustrated an arrangement whereby there will be no sag in the trolley wire support and thus there will be very little outward strain upon eye bolts connected in the side of a building as is frequent in the hanging of a trolley wire in city areas where there is a crowded condition and buildings instead of poles are utilized for the hanging of a trolley wire.

The supporting device consists of a tubular member 21 upon which suitable insulation 22, 22' is provided either by winding or molding. That which I have illustrated is provided by molding which takes place about a knurled surface 23 on the tube 21. I provide a ring 24, shown more fully in Fig. 9, which has an octagonal inner surface 25 or any out-of-round configuration which will assist in preventing rotation of the ring upon the insulation 22. This ring has projecting therefrom a portion 26 which is reduced as at 27 to provide a shoulder as at 28 and is further reduced as at 29 and threaded as at 30 to receive the nut 31. This ring is cast and is then drilled to provide an opening diametrically opposite the projection 26 which opening is tapped to provide a thread as at 32, and I then insert a plug 33 (Fig. 11) in this opening which extends into engagement with the tube 21.

With this plug 33 inserted in the ring and the ring properly positioned in a mold about the tube 21, I flow in the insulating material 22 under the proper heat and pressure conditions so as to fill up the space between the tube and the ring to provide the desired insulation between the ring and the tube and the fixing of the parts in this relation. This insulation is of a suitable composition to provide the desired dielectric which according to the AEE standard should be twice the normal voltage carried by the trolley wire plus 1000. A substantial excess, however, of this requirement usually is provided.

After this molding operation occurs, I then back out the plug 33 thus leaving a smooth inner surface at 34 along the insulation 22 and substitute for such plug used only during the molding, a plug 35 which is threaded only through the thickness of the ring 24 and has a protuberance 36 of lesser diameter which is spaced a substantial extent from the smooth side walls 34 and is also spaced from the tube 21 an extent to provide the desired air gap which will permit of an arcing between the end of the projection 36 and the tube when a voltage is reached less than the dielectric of the insulation used. As the usual voltage carried by the trolley wire supported will be 600 volts, I will set the air gap at substantially .040 inch which will permit of a jumping in excess of 2600 volts, which is a voltage below that at which burning of the insulation will occur.

Further, by reason of the smooth walls 34 there is less tendency to creep because of the fibrous character of the insulation than were these fibers exposed which might burn if arcing occurs.

After this plug is inserted and set to the desired distance, the plug is soldered in place which fixes its location and also seals the air gap; thus the terminals of the air gap are hermetically sealed. Very little oxygen is present in the air which is trapped in this opening 37 and when this oxygen is exhausted, no burning of any character will take place, and after a large number of arcings, by examination, I have found no evidence of burning present between the point 36 and the tube.

When this molding occurs about the knurled surface 23 of the tube and within the cast ring, a very firm bond is provided between the tube 21 and the insulation. The insulation flows into the grooves of the knurling provided in the tube and prevents a twisting of the insulation body upon the tube. As the ring surrounds the insulation, any expansion which would be necessary to relieve the portions of insulation which extend into the grooves is prevented.

This insulation on the tube 21 is duplicated again at 22' at another point along the tube and may be further duplicated at still another point if three trolley wires are to be supported by the tube, such as illustrated in Fig. 3 where the track trolley vehicle is utilized along side of the trackless trolley vehicle which utilizes two wires for its motivation.

Each stud 27 supports a clamp designated generally 38 consisting of opposite jaws 39 and 40 held together by screw or bolt 41 gripping the trolley wire 42 which has grooves 43 therein for the reception of such clamp. Two of such clamp arrangements are connected together by a bridge piece 44 for the reception of the stud 27. A washer 44' is interposed between the nut 31 and this bridge piece which may be of the split ring lock washer type for securely holding the nut 31 against backing off.

The entire supporting device is mounted upon a cable 20 by the cable extending through the opening in the tube 21. The center part of this supporting cable 20 will sag, and in order that the device be horizontally supported, one end portion 45 of this tube is bent upwardly at substantially 5 degrees, as illustrated in Fig. 4, while the other end portion 46 is bent downwardly substantially 5 degrees so that together they will compensate for the one inch in ten inclination of the cable 20. One device designated generally 47 will have the upwardly tilted portion 45 nearest the pole and the downwardly tilted portion 46 more distant from its nearest pole; the companion supporting device 48 of the two-way transportation system will have the supporting device turned around so that likewise its portion near the pole 45 will tilt upwardly and its portion 46 more distant from the pole will tilt downwardly.

In Fig. 3 I have illustrated the trolley wires as supported between buildings extending along either side of the street. The building on one side is designated 61 and on the other side, 62. My trolley wire support tubes designated 21 are positioned between the buildings and have a cable 20' extending through them from one eye bolt 63 to an eye bolt 64 on the opposite building. I will attach a guy wire 65 or 66 which will extend form an eye bolt 67 or 68 in the building at a location a substantial distance above the eye bolts 63 and 64 to the tube 21 which will be attached at a location along the length of the tube, which will cause the tube to be balanced and remain horizontal. In the illustration in Fig. 3, a pair of trolley wires 12 and 13 are supported by the hanger 21 and also an additional wire 69 is supported from this hanger for utilization of a track trolley car where tracks are provided as well as the trackless type in thickly populated downtown areas.

By this arrangement, very small eye bolts need to be used. The weight is supported substantially by the guy wires 65, 66 at a very advantageous angle from above so that the component of force tending to pull the eye bolt from the building is minimized, and also small eye bolts 63 or 64 may be utilized, as the weight is so substantially taken from the supported construction that very little outward pull on such bolts occurs.

It will be apparent that the entire device on tube 21 may slide along a strand 20 so that it may be properly aligned, such as by a transit with the next similarly-supported device, and when properly aligned, any suitable means may be used for clamping the device to the cable 20. One such means is illustrated in Fig. 10 which consists of a member 49 threaded as at 49' to receive the threaded end 50 of the tube 21. A pair of tapered clamps 51 embrace the cable 20 and may be forced tightly toward each other by the tapered surface 52 of a nut 53 threaded onto the nut 49 as at 54.

Although I have illustrated the device as consisting of a tube 21 upon which two spaced insulations 22 and 22' are mounted, so that these may be adjusted together with the device along the support cable or span wire 20, it will be readily apparent that the tube 21 instead of being of a length sufficient to support both insulations 22 and 22' may consist of short sections of tube each mounted individually and each individually adjustable along the cable 20 with means to clamp the same in position; or the insulation may be mounted directly upon the cable itself in a desired fixed relation which will not be adjustable.

By reason of the light structure of the device provided, a large number of these devices may be utilized in supporting the trolley wires 55 in an arc as illustrated in Fig. 2. A plurality of the devices 21 are provided at spaced intervals such, for instance, as at the ends and center of the arc in a manner similar to that above indicated by cables passing through them, while intermediate supports 56 are arranged with eyes 57 at their inner ends which may be laced as at 58 along a supporting strand 59 by reason of their passing through insulators 60 arranged in spaced relation along the support strand 59. In this manner the wires 55 are held the required distance apart while the change in direction made will vary by a plurality of segments, each a predetermined number of degrees away from the line of direction of the other such, for instance, as 3 degrees in actual practice, there being provided a sufficiently large number of these support devices for accomplishing the minimum number of degree change so that wear upon the wire at the point of direction change will be reduced to a minimum.

In the two-trolley system utilized for trackless trolleys, one of the wires is positive and the other is negative, or the ground; and while in the single-trolley system the trolley wire supported is positive and there is no connection to the ground, in this latter arrangement when lightning causes increased voltage on the trolley wire and the gap in the insulator is jumped by the excessive voltage, the insulators, such as 18, are also jumped that the charge may reach the ground through the poles, it being remembered that under such conditions usually all the parts are wet, making the travel of an electric current jumping in this manner more readily occurring than were weather conditions dry. However, in the two-trolley system, an electric charge which accumulates upon the positive wire would jump the air gap in the present arrangement in conducting the excessive voltage from the trolley wire to the tube 21, thence the charge would proceed along the tube 21 and back through the gap to the negative wire from the tube 21 to the trolley wire, which then would transfer the charge to the ground, and no jumping of the insulators in the supporting cables to the poles would occur. Thus, the supercharge is entirely taken care of in the arrangement of this system itself, without breaking down of the insulation; and by reason of the hermetical seal about the air gap, no burning occurs at the point of arcing.

The foregoing description is directed solely towards the construction illustrated, but I desire it to be understood that I reserve the privilege of resorting to all the mechanical changes to which the device is susceptible which come within the terms of the following claims.

I claim:

1. In a high tension wire support, a tube through which a span wire may be passed, insulating material embracing the tube, a member embracing a portion of said insulating material and tube and rigidly holding the insulating material on the tube, said insulating material being provided with an opening between the said member and tube, and conducting means on said member projecting into said opening to provide an air gap between said member and tube of a less dielectric than said insulating material between said member and tube.

2. In a high tension wire support, a tube through which a span wire may be passed, insulating material embracing the tube, at spaced points therealong, members each embracing a portion of said insulating material and tube and rigidly holding the insulating material on the tube, each insulating material being provided with an opening between the member embracing it and the tube, and conducting means on each member projecting into said opening to provide an air gap between said member and tube of a less dielectric than said insulating material between said member and tube.

3. In a high tension wire support, a tube through which a span wire may be passed, insulating material embracing the tube, a member embracing a portion of said insulation material and tube and rigidly holding the insulating material on the tube, said insulating material being provided with an opening between the said member and tube, a threaded opening in said member registering with the opening in said insulator, adjustable conducting means having removable threaded engagement with the opening in said member and projecting into said opening in said insulating material to provide an air gap between said member and tube of a less dielectric than said insulating material between said member and tube.

4. In a support for a pair of trolley wires, a tube, a roughening on the tube surface at two spaced locations thereon, insulating material embracing said tube at said two roughened locations, a pair of rings one about a portion of each insulating material and the tube embraced thereby holding the material rigidly on the tube, said ring having an out-of-round inner surface to which the insulating material embraced is closely fitted, means suspended from each ring for attaching to a trolley wire to support the same, a flexible span wire extending through said tube and along which said tube and the parts mounted thereon may be moved as a unit for adjustment, and means to clamp said tube on said span wire in desired adjusted position.

CORREL O. SPARHAWK.